United States Patent [19]

Coniglione

[11] 3,951,313

[45] Apr. 20, 1976

[54] RESERVOIR WITH PREPACKED DILUENT

[75] Inventor: Roy Coniglione, Sparta, N.J.

[73] Assignee: Becton, Dickinson and Company, East Rutherford, N.J.

[22] Filed: June 5, 1974

[21] Appl. No.: 476,522

[52] U.S. Cl. ............................... 222/186; 73/425.6; 206/72; 206/498; 222/541

[51] Int. Cl.$^2$ ....................... B67D 5/06; G01N 1/14; B65D 47/10

[58] Field of Search .............. 206/498, 72; 222/541, 222/186; 215/99.5; 73/425.6

[56] References Cited

UNITED STATES PATENTS

| | | | |
|---|---|---|---|
| 2,507,248 | 5/1950 | DeSwart | 222/541 X |
| 2,659,222 | 11/1953 | Meier | 215/99.5 |
| 2,851,154 | 9/1958 | Dingeldein | 206/72 X |
| 2,918,188 | 12/1959 | Todd | 215/99.5 |
| 3,045,494 | 7/1962 | Gerarde | 73/425.6 |
| 3,162,339 | 12/1964 | Lecluyse | 222/541 |
| 3,240,384 | 3/1966 | Lermer | 206/806 X |
| 3,325,860 | 6/1967 | Hansen | 53/194 |
| 3,568,878 | 3/1971 | Fotos | 215/99.5 |
| 3,699,348 | 10/1972 | Hocherl | 73/425.6 X |

FOREIGN PATENTS OR APPLICATIONS

| | | | |
|---|---|---|---|
| 188,484 | 11/1922 | United Kingdom | 215/99.5 |

*Primary Examiner*—Leonard Summer
*Attorney, Agent, or Firm*—Kane, Dalsimer, Kane, Sullivan and Kurucz

[57] ABSTRACT

A reservoir or container of unitary construction having a predetermined volume of diluent disposed therein is disclosed. The reservoir includes a shearable cap or closure which, once removed, cannot be reassembled. The reservoir is provided with an access opening arranged and constructed to receive a capillary pipette assembly having a predetermined volume of sample so that an accurate mixture of diluent and sample is obtained. The reservoir may also be used as a sample cup for automated analyzers.

4 Claims, 5 Drawing Figures

RESERVOIR WITH PREPACKED DILUENT

BACKGROUND OF THE INVENTION

This invention relates generally to a hermetically sealed container or reservoir having a prepackaged, accurately measured volume of diluent disposed therein. The reservoir is of unitary construction and is provided with an access opening which is arranged and constructed to receive a capillary pipette assembly for discharging a predetermined known volume of sample to be mixed with the diluent in a predetermined known ratio.

DESCRIPTION OF THE PRIOR ART

Resilient reservoirs or containers, particularly of the type that are prepackaged to contain a predetermined known volume of diluent disposed therein, are known. For example, one design is shown in U.S. Pat. No. 3,045,494 which employs a resilient thermoplastic container having a predetermined known volume of diluent therein and an access opening which is sealed by a removable closure. The diluent is placed in the container prior to mounting the closure in the access opening which is thereafter sealed by dipping the closure in wax to form an airtight seal around the plug.

In other forms of a container the access opening is formed with a frangible diaphragm which is punctured when the container is to be used. The container is filled through the bottom with the bottom being sealed in position as by ultrasonic welding.

It is also known to provide apparatus for making containers of unitary construction in which the container is molded, filled and sealed in one operation as, for example, as shown in U.S. Pat. No. 3,325,860.

SUMMARY OF THE INVENTION

It is an object of the present invention to provide a reservoir or container which may be blow molded, filled with a desired known volume of diluent and hermetically sealed in a single operation. It is another object of the invention to provide a reservoir in which the diluent is sterile when introduced and no further sterilization procedures are required after the container is filled and hermetically sealed.

It is another object of the invention to provide a closure which is shearable and which cannot be replaced on the container after being removed.

It is still another object of the invention to provide a hermetically sealed container of unitary construction which is made of resilient thermoplastic material and has sealed therein a predetermined known volume of diluent which may be used as a sample cup for automated analyzers after a predetermined known volume of sample is mixed with the diluent.

The invention generally contemplates the provision of a hermetically sealed reservoir or container having a predetermined volume of diluent prepackaged therein. The container is made of a resilient thermoplastic material having a shearable closure which once removed from the container cannot be replaced. The access opening formed in the reservoir is arranged and constructed to receive a capillary pipette assembly for accurately mixing a predetermined known volume of sample with the diluent in the reservoir so that a mixture of known ratios of sample to diluent is obtained.

DESCRIPTION OF THE DRAWINGS

For a better understanding of the invention, reference is had to the drawings which illustrate a preferred embodiment of the invention herein.

DESCRIPTION OF THE PREFERRED EMBODIMENTS

Figure 1:
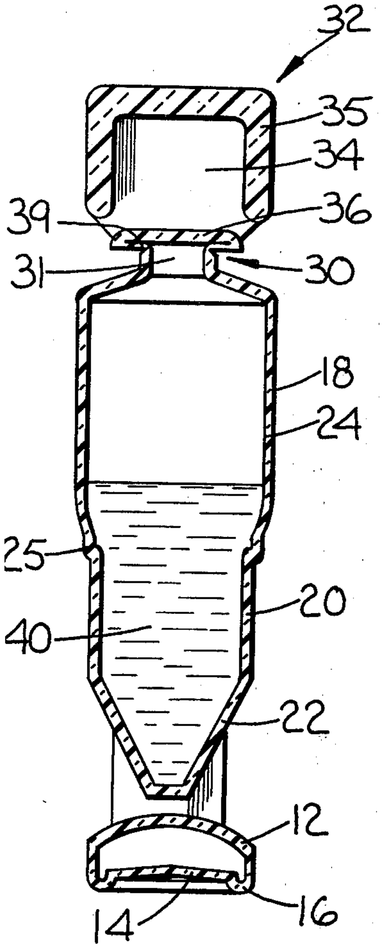
FIG. 1 is a sectional, elevational view of the container or reservoir fully assembled with the liquid disposed therein.
Figure 2:
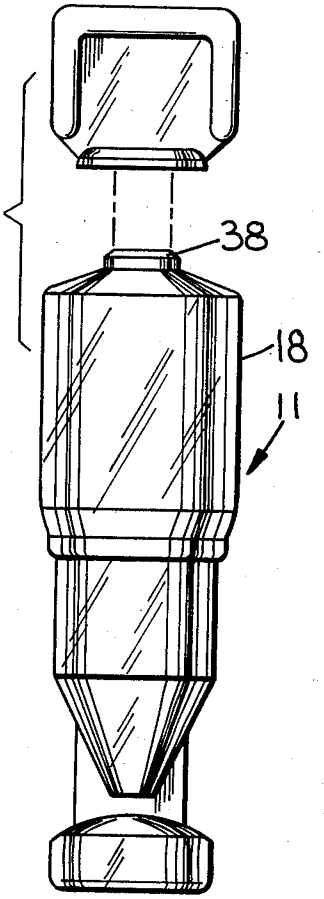
FIG. 2 is an elevational view of the reservoir with the cap broken away so as to uncover the access opening.
Figure 3:
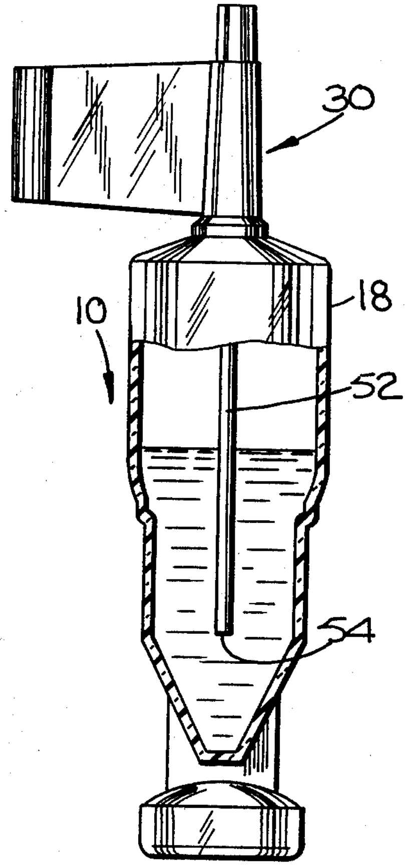
FIG. 3 is a partly sectional, elevational view of the assembly after the capillary pipette assembly is mounted in the access opening so that a predetermined volume of sample is mixed with the premeasured and prepackaged diluent disposed in the reservoir.
Figure 4:
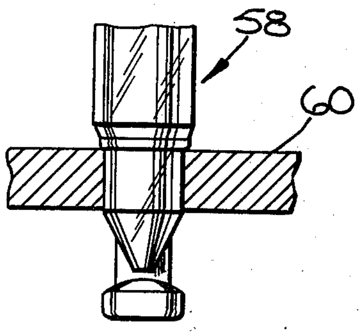
FIG. 4 illustrates the use of the reservoir as a sample cup mounted in a section of tray for use with an automated analyzer.
Figure 5:
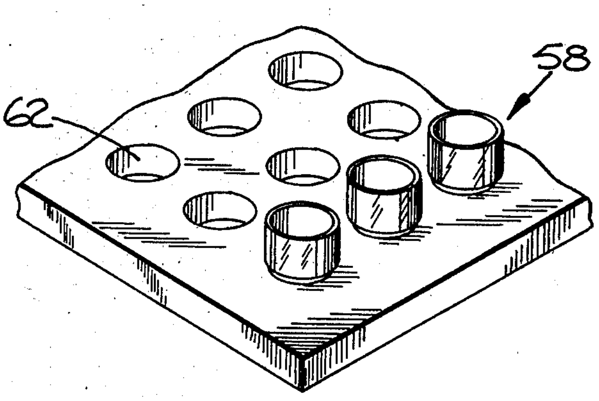
FIG. 5 is an isometric view partly broken away illustrating a plurality of the reservoirs with the top portions removed for use with an automated analyzer.

FIGS. 1 through 3 illustrate the various parts and use of the reservoir which contains a prepackaged hermetically sealed diluent therein is shown before and after use. Reservoir 10 is preferably made of a flexible thermoplastic material such as polyethylene, polypropylene or the like. Also, container 10 is preferably blow molded so that the diluent can be premeasured before effecting a hermetic seal. Container 10 is provided with a stand 12. The bottom surface 14 is in the form of a disc which is recessed so as to form an annular rim 16. Disc 14 is curved arcuately upward in the form of a dome to permit reservoir or container 10 to stand vertically which minimizes the amount of wobble or which prevents its accidental tipping when in a vertical position. The container body 18 has a lower cylindrical section 20 of reduced diameter which terminates in a closed frusto-conical bottom section 22. An enlarged cylindrical section 24 forms the upper part of container 10. The upper section 24 and lower section 20 are separated by an annular exterior circumferentially formed rib 25.

The top section 24 of container 10 terminates in a reduced tubular neck section 30 and is hermetically sealed by closure 32 across the opening 31 of neck section 30. Closure 32 is preferably made having an upstanding wall or portion to provide finger engaging surfaces to facilitate removal of closure 32 from neck 30. Wall 34 is surrounded by an outer thickened portion or rib 35 to reinforce wall 34. The base 36 of closure 32 is joined to neck section around its top peripheral edge 38 which is less than the entire area of the outer surfaces of neck section 30 to provide a relatively narrow weld which is readily shearable from the neck section 30 when closure 32 is twisted radially about the longitudinal axis of container 10. As seen in FIG. 2, closure 32 has been removed from container 10 so that neck 30 is opened and is ready to receive the capillary assembly as shown in FIG. 3. Also, when closure 32 is removed it cannot be resealed to container 10 thereby alerting its user that the container may have been tampered with and its contents may be contaminated and should be discarded.

The diluent 40 which is prepackaged in container 12 and hermetically sealed before use is sterile and does not require further sterilizing before use. The capillary pipette assembly 50 shown in FIG. 3 may be of the type illustrated in U.S. Pat. No. 3,045,494. Capillary pipette assembly 50 is mounted in position in container 10 and is shown after all of the sample has been removed from bore 54 of capillary tube 52. The mixture which comprises the accurately measured volume of diluent 40 and the accurately measured volume of sample from bore 54 is uniformly mixed and is ready for testing.

Where container 10 is to be used as a sample cup for automated analyzers the top portion 24 is cut away just above the level of the liquid mixture and is positioned in tray 60 so that the lower section 20 nests within the opening 62 of tray 60.

When using the reservoir of the invention herein cap 32 is twisted so that it is sheared from the top rim 38 of neck section 30 to uncover the access opening 31. Then a sample is collected in the manner such as is described in U.S. Pat. No. 3,045,494. Prior to mounting capillary assembly in access opening 31 container 10 is squeezed with the fingers so that when capillary 50 is immersed in the diluent 40 the sample will be sucked into diluent 40 by releasing the hand pressure on container 10 so that it returns to its normal configuration. Thereafter, the procedure is repeated several times, that is, by squeezing gently to force the liquid mixture into the bore 54 of capillary 52 all of the sample is washed uniformly therefrom to provide a uniformly mixed sample with diluent. Thereafter, the mixture in container 10 is ready for testing, for example, by placing a desired volume of sample on a slide for counting blood cells where whole blood is used as the sample. Where plasma or serum is used the container may be used with automated machinery such as an automated analyzer. When container 10 is used as a sample cup 58 a segment of top section 24 of container 10 is removed and the lower section forming sample cup 58 is placed in tray 60 and is in position to receive the automatic pipetting means of the automated analyzing machine which sequentially removes accurately measured volumes from sample cup 58.

From the foregoing description it is readily apparent that the objects of the invention have been accomplished in which a hermetically sealed liquid disposed in a container, is prepackaged at the time of manufacture and is utilized in a test system for obtaining predetermined ratios of sample to diluent. The closure on the container is such that once removed it cannot be resealed in place thereby warning the user that the container may be contaminated or portions of the diluent may have been lost and must be discarded. Also, the container is useful as a sample cup for use in automated analyzing machines so that no sample transfer to a sample cup is required thereby reducing equipment costs.

Having thus described the principal embodiments of the invention it is noted that many variations and changes may be made without departing from the invention which is defined in the appended claims.

What is claimed:

1. A container of unitary construction comprising:

a prepackaged accurately measured volume of diluent disposed in said container and being hermetically sealed therein, said container having a shearable closure covering an access opening formed in said container, said container having a body for housing said diluent, said body including a lower section of reduced diameter and terminating in a closed end, and a stand mounted on said closed end to provide means for maintaining the container in an upright position.

2. The container of claim 1 wherein said stand includes an upstanding support leg formed integrally between the closed end of the container and the stand.

3. The container of claim 1 wherein said stand includes a rim formed around the bottom edge thereof and a disc integrally formed therewith which is curved arcuately upwardly away from the bottom rib to support said stand to aid in maintaining the stability of the container when in an upright position.

4. The container of claim 1 wherein the shearable closure includes an upstanding handle integrally formed with a base member covering the said access opening providing finger engaging surfaces for shearing the closure from the container.

* * * * *

UNITED STATES PATENT OFFICE

CERTIFICATE OF CORRECTION

PATENT NO. : 3,951,313

DATED : April 20, 1976

INVENTOR(S) : Roy Coniglione

It is certified that error appears in the above-identified patent and that said Letters Patent are hereby corrected as shown below:

Please insert Claims 5-8, inclusive, which were omitted by the Patent Office in the above Letters Patent. They read:

Claim 5. The container of claim 4 wherein said base member includes a lower surface which contacts the upper rim surface defining the opening formed in the container and a weld having an area of contact less than the wall thickness of the access opening.

Claim 6. The container of claim 1 wherein the surfaces of the container intermediate the upper and lower sections are adapted to be severed with said reduced lower section being adapted to nest within the opening of a tray so that the contents of the container can be removed for conducting tests on automated analyzing equipment.

Claim 7. The container of claim 1 wherein a portion of said body between said section of reduced diameter and said closed end, has the configuration of the base end of a cone.

Claim 8. The container of claim 7 wherein said portion is frusto-conical in configuration.

Signed and Sealed this

Thirteenth Day of July 1976

[SEAL]

*Attest:*

RUTH C. MASON
*Attesting Officer*

C. MARSHALL DANN
*Commissioner of Patents and Trademarks*